(12) United States Patent
Isowaki (10) Patent No.: US 12,367,100 B2
(45) Date of Patent: Jul. 22, 2025

(54) MAGNETIC REPRODUCING PROCESSING DEVICE, MAGNETIC RECORDING/REPRODUCING DEVICE AND MAGNETIC REPRODUCING METHOD

(71) Applicant: KABUSHIKI KAISHA TOSHIBA, Tokyo (JP)

(72) Inventor: Yousuke Isowaki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 10 days.

(21) Appl. No.: 18/419,432

(22) Filed: Jan. 22, 2024

(65) Prior Publication Data

US 2025/0021436 A1    Jan. 16, 2025

(30) Foreign Application Priority Data

Jul. 12, 2023    (JP) .................. 2023-114410

(51) Int. Cl.
*G06F 11/10* (2006.01)
*G06F 11/14* (2006.01)
*G06N 3/06* (2006.01)
*G11B 20/10* (2006.01)

(52) U.S. Cl.
CPC ...... *G06F 11/1076* (2013.01); *G06F 11/1476* (2013.01); *G06N 3/06* (2013.01); *G11B 20/10* (2013.01)

(58) Field of Classification Search
CPC ............ G06F 11/1076; G06F 11/1476; G06N 3/06; G11B 20/10
See application file for complete search history.

(56) References Cited

U.S. PATENT DOCUMENTS

| | | | |
|---|---|---|---|
| 10,804,938 B2 | 10/2020 | Qin | |
| 12,107,603 B1* | 10/2024 | Shende | H03M 13/1125 |
| 2021/0142158 A1* | 5/2021 | Agrawal | H03M 13/1111 |
| 2022/0368349 A1* | 11/2022 | Luo | H03M 13/01 |
| 2023/0068268 A1* | 3/2023 | Isowaki | G11B 20/10055 |

OTHER PUBLICATIONS

C. Chinni, A. Kulkami, D. MPai, K. Mitra and P. K. Sarvepalli, "Neural Decoder for Topological Codes using Pseudo-Inverse of Parity Check Matrix,"2019 IEEE Information Theory Workshop (ITVV), Visby, Sweden, 2019, pp. 1-5, (Year: 2019).*

* cited by examiner

*Primary Examiner* — Cynthia Britt
(74) *Attorney, Agent, or Firm* — Knobbe, Martens, Olson & Bear, LLP (57) ABSTRACT

According to one embodiment, a magnetic reproducing processing device includes a decoder and an error correction decoder. A first signal based on a reproduced signal is input to the decoder. A signal based on a second signal output from the decoder is input to the error correction decoder. The error correction decoder is configured to correct errors in the second signal based on a check matrix. The decoder includes a neural network layer. The neural network layer includes a plurality of calculation nodes. A connection relationship between the plurality of calculation nodes is based on the check matrix.

20 Claims, 4 Drawing Sheets

MAGNETIC REPRODUCING PROCESSING DEVICE, MAGNETIC RECORDING/REPRODUCING DEVICE AND MAGNETIC REPRODUCING METHOD

CROSS-REFERENCE TO RELATED APPLICATIONS

This application is based upon and claims the benefit of priority from Japanese Patent Application No. 2023-114410, filed on Jul. 12, 2023; the entire contents of which are incorporated herein by reference.

FIELD

Embodiments described herein relate generally to a magnetic reproducing processing device, a magnetic recording and reproducing device, and a magnetic reproducing method.

BACKGROUND

For example, fewer errors are desired in magnetic reproducing processing devices.

DETAILED DESCRIPTION

According to one embodiment, a magnetic reproducing processing device includes a decoder and an error correction decoder. A first signal based on a reproduced signal is input to the decoder. A signal based on a second signal output from the decoder is input to the error correction decoder. The error correction decoder is configured to correct errors in the second signal based on a check matrix. The decoder includes a neural network layer. The neural network layer includes a plurality of calculation nodes. A connection relationship between the plurality of calculation nodes is based on the check matrix.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
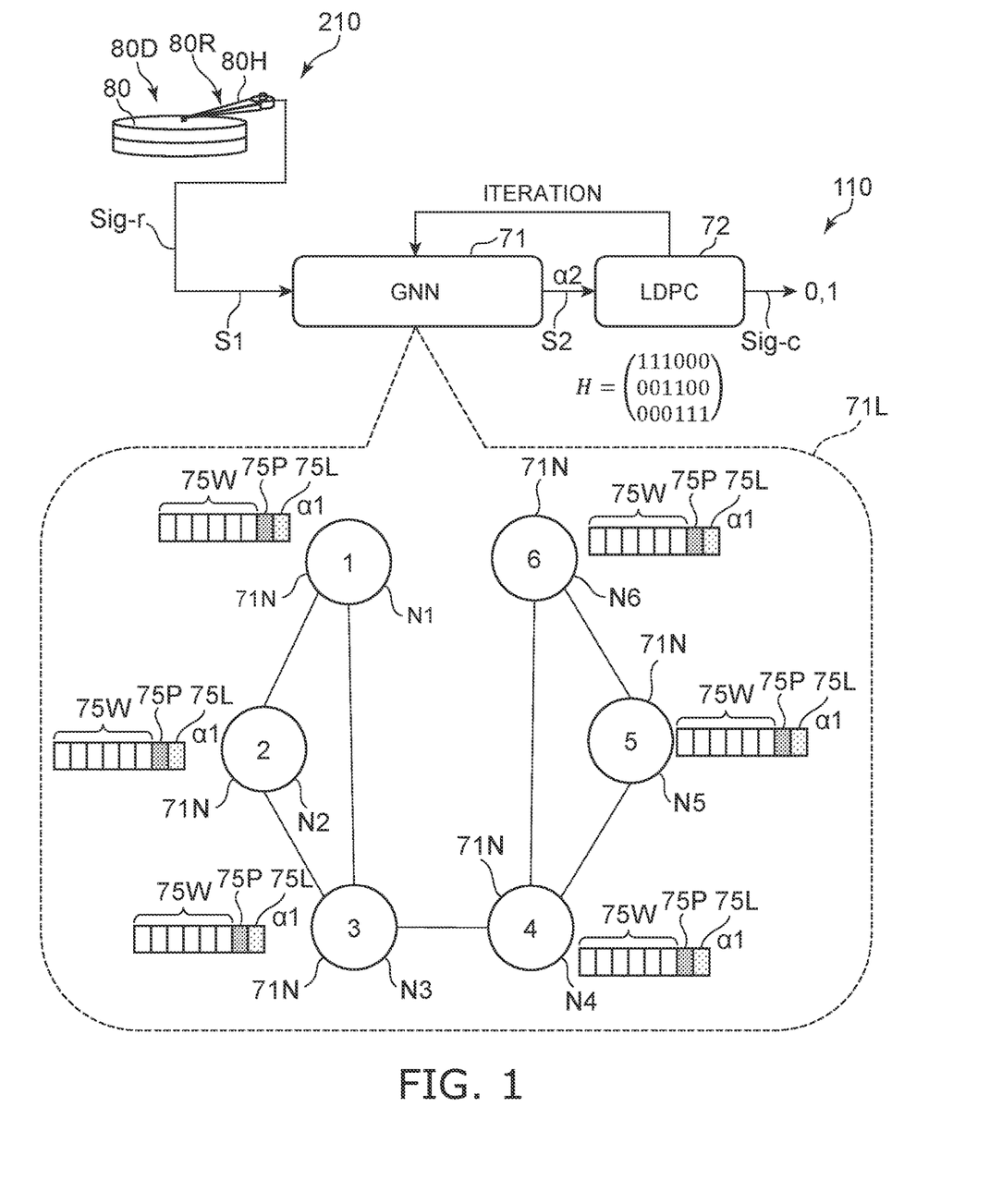
FIG. 1 is a schematic diagram illustrating a magnetic reproducing processing device and a magnetic recording/reproducing device according to a first embodiment.

FIG. 1 is a schematic diagram illustrating a magnetic reproducing processing device and a magnetic recording/reproducing device according to a first embodiment.

As shown in FIG. 1, a magnetic recording/reproducing device 210 according to the embodiment includes a magnetic reproducing processing device 110 according to the embodiment. The magnetic recording/reproducing device 210 may further include a magnetic recording/reproducing section 80D.

The magnetic recording/reproducing section 80D includes a magnetic recording medium 80. The magnetic recording medium 80 may include, for example, a magnetic disk (HDD: Hard Disk Drive). The magnetic recording/reproducing section 80D may include, for example, an SSD (Solid State Drive). The magnetic recording/reproducing section 80D may include, for example, a recording/reproducing section 80R. The recording/reproducing section 80R may include, for example, a magnetic head 80H. Information is recorded on the magnetic recording medium 80 by the recording/reproducing section 80R (magnetic head 80H). Information recorded on the magnetic recording medium 80 is reproduced by the recording/reproducing section 80R (magnetic head 80H). A reproduced signal Sig-r is obtained from the recording/reproducing section 80R. The reproduced signal Sig-r may be, for example, a time-series continuous or discontinuous signal.

The reproduced signal Sig-r obtained by the magnetic recording/reproducing section 80D (recording/reproducing section 80R) is supplied to the magnetic reproducing processing device 110. The reproduced signal Sig-r is processed (decoded) by the magnetic reproducing processing device 110. The result (decoding process) processed by the magnetic reproducing processing device 110 is output from the magnetic reproducing processing device 110 as a decoded signal Sig-c. The decoded signal Sig-c is, for example, a binary signal.

The magnetic reproducing processing device 110 includes a decoder 71 and an error correction decoder 72. The decoder 71 receives a first signal S1 based on the reproduced signal Sig-r. A signal based on a second signal S2 output from the decoder 71 is input to the error correction decoder 72.

The error correction decoder 72 is configured to correct errors in the second signal S2 based on a check matrix H. In this example, the check matrix H is a matrix corresponding to 6 bits.

The decoder 71 includes a neural network layer 71L. The neural network layer 71L includes a plurality of calculation nodes 71N. In this example, the number of the plurality of calculation nodes 71N is six. The number of the plurality of calculation nodes 71N corresponds to the number of multiple bits in the check matrix H. In this example, the plurality of calculation nodes 71N include a first node N1, a second node N2, a third node N3, a fourth node N4, a fifth node N5, and a sixth node N6.

In the embodiment, the connection relationship between the plurality of calculation nodes 71N is based on the check matrix H. In this example, the first node N1 is connected to the second node N2 and the third node N3. The second node N2 is connected to the first node N1 and the third node N3. The third node N3 is connected to the first node N1, the second node N2, and the fourth node N4. The fourth node N4 is connected to the third node N3, the fifth node N5, and the sixth node N6. The fifth node N5 is connected to the fourth node N4 and the sixth node N6. The sixth node N6 is connected to the fourth node N4 and the fifth node N5.

In the embodiment, the connection relationship between the plurality of calculation nodes 71N is based on the check matrix H used by the error correction decoder 72. This results in a lower BER (Bit error rate). According to the embodiment, it is possible to provide a magnetic reproducing processing device that can suppress errors. Highly accurate decoding is possible.

In the embodiment, the decoder 71 may be, for example, a GNN (Graph neural network). For example, machine learning is performed in the GNN. In the embodiment, the error correction decoder 72 may include, for example, a Low-Density Parity-Check Codes (LDPC) decoder. Highly accurate decoding can be performed.

In the embodiment, the reproduced signal Sig-r includes waveform information 75W, bit position information 75P, and first likelihood ratio information 75L. The waveform information 75W includes information regarding waveforms before and after the bit of interest. For example, the waveform information 75W includes a first waveform of the first bit, a second waveform of the second bit before the first bit, and a third waveform of the third bit after the first bit. The second bit before the first bit may include multiple bits. The third bit after the first bit may include multiple bits. Bit position information 75P includes position information of the first bit. The bit position information 75P includes, for example, information on the number of the bit.

The first likelihood ratio information 75L includes information regarding the likelihood ratio (first likelihood ratio group $\alpha 1$) in each of the plurality of calculation nodes 71N (that is, the plurality of bits). The first likelihood ratio group $\alpha 1$ includes likelihood ratios for each of a plurality of bits. The waveform information 75W, the bit position information 75P, and the first likelihood ratio information 75L correspond to feature values in the plurality of calculation nodes 71N.

The first signal S1 based on such reproduced signal Sig-r is input to the decoder 71. In the decoder 71, the first signal S1 based on the reproduced signal Sig-r is processed by calculation using the plurality of calculation nodes 71N having the connection relationship based on the check matrix H. The processing result is output from the decoder 71 as the second signal S2. The second signal S2 includes likelihood ratio group $\alpha 2$. The likelihood ratio group $\alpha 2$ includes, for example, likelihood ratios regarding each of the plurality of bits.

As shown in FIG. 1, the output of error correction decoder 72 may be input to decoder 71. The decoder 71 is configured to use the output of the error correction decoder 72 to output the second signal S2. For example, an iteration is performed. In one example, the number of iterations may correspond to the number of hidden layers included in the decoder 71.

In one example, the number of feature values in each of the plurality of calculation nodes 71N is seven. The number of outputs in each of the plurality of calculation nodes 71N is one. In the decoder 71, learning regarding the following first equation may be performed.

$$z_i^{(l+1)} = MLP^{(l+1)}\left((1 + \varepsilon^{(l+1)})z_i^{(l)} + \sum_{j \in N_i} z_j^{(l)}\right) \quad (1)$$

In the first equation, "MLP" and "E" are coefficients. A convolution operation based on the first equation is performed. For example, a three-layer GIN (Graph Isomorphism Network) structure may be applied.

In one example, a fully connected neural network is applied in the MLP in the first equation. The number of input nodes is seven. The number of output nodes is 1. The number of intermediate layer nodes is 15. The number of intermediate layers is five.

In the embodiments, for example, machine learning is performed using local convolution operations. In the machine learning, the degree of contribution of errors may be changed depending on the number of connections in the plurality of calculation nodes 71N. For example, the number of connections of one of the plurality of calculation nodes 71N is greater than the number of connections of another one of the plurality of calculation nodes 71N. In this case, in the learning (machine learning) of the decoder 71, the degree of contribution of an error related to one of the plurality of calculation nodes 71N is larger than the degree of contribution of an error related to another one of the plurality of calculation nodes 71N. Thereby, more efficient learning can be performed. The decoder 71 being highly accurate can be provided.

For example, as shown in FIG. 1, the number of connections of the third node N3 is greater than the number of connections of the first node N1. In this case, in the learning of the decoder 71, the degree of contribution of the error regarding the third node N3 is set to be larger than the degree of contribution of the error regarding the first node N1. The degree of contribution corresponds to, for example, a coefficient regarding weight.

Figure 2:
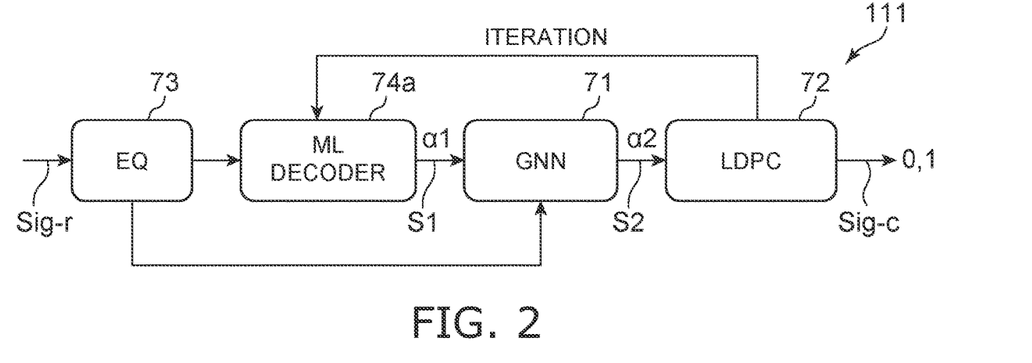
FIG. 2 is a schematic diagram illustrating a magnetic reproducing processing device according to the first embodiment.

FIG. 2 is a schematic diagram illustrating a magnetic reproducing processing device according to the first embodiment.

As shown in FIG. 2, a magnetic reproducing processing device 111 according to the embodiment further includes a first maximum likelihood decoder 74a. The configuration of the magnetic reproducing processing device 111 except for this may be the same as the configuration of the magnetic reproducing processing device 110.

In the magnetic reproducing processing device 111, a signal based on the reproduced signal Sig-r is input to the first maximum likelihood decoder 74a. The output of the first maximum likelihood decoder 74a is input to the decoder 71 as the first signal S1. In the magnetic reproducing processing device 111, errors are further suppressed. The first maximum likelihood decoder 74a may include, for example, a Viterbi decoder.

As shown in FIG. 2, the magnetic reproducing processing device 111 may further include a waveform equalizer 73. A signal based on the reproduced signal Sig-r is input to the waveform equalizer 73. The output of the waveform equalizer 73 may be input to the decoder 71. In this example, the output of the waveform equalizer 73 is input to the first maximum likelihood decoder 74a, and the output of the first maximum likelihood decoder 74a is input to the decoder 71.

Figure 3:
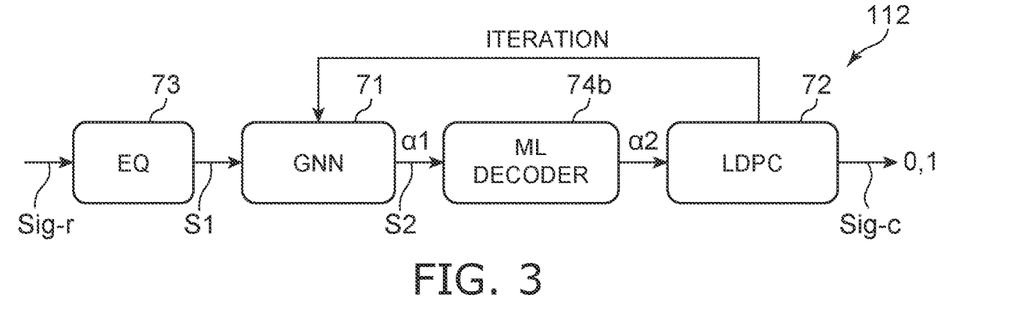
FIG. 3 is a schematic diagram illustrating a magnetic reproducing processing device according to the first embodiment.

FIG. 3 is a schematic diagram illustrating a magnetic reproducing processing device according to the first embodiment.

As shown in FIG. 3, a magnetic reproducing processing device 112 according to the embodiment further includes a second maximum likelihood decoder 74b. The configuration of the magnetic reproducing processing device 112 except for this may be the same as the configuration of the magnetic reproducing processing device 110 or the magnetic reproducing processing device 111.

In the magnetic reproducing processing device 112, the second signal S2 output from the decoder 71 is input to the second maximum likelihood decoder 74b. The output of the second maximum likelihood decoder 74b is input to the error correction decoder 72. In the magnetic reproducing processing device 112, errors are further suppressed. The second maximum likelihood decoder 74b may include, for example, a Viterbi decoder.

As shown in FIG. 3, the magnetic reproducing processing device 112 may further include a waveform equalizer 73. The signal based on the reproduced signal Sig-r is input to the waveform equalizer 73. The output of the waveform equalizer 73 is input to the decoder 71.

Figure 4:
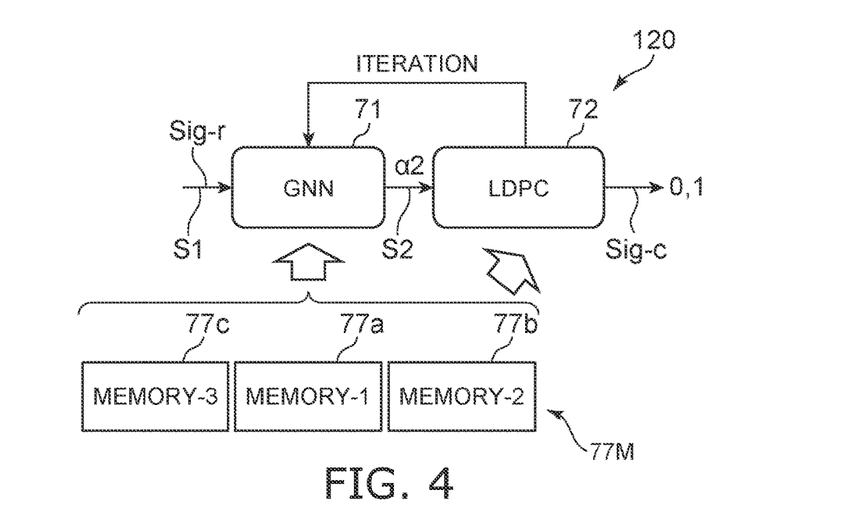
FIG. 4 is a schematic diagram illustrating a magnetic reproducing processing device according to the first embodiment.

FIG. 4 is a schematic diagram illustrating a magnetic reproducing processing device according to the first embodiment.

As shown in FIG. 4, a magnetic reproducing processing device 120 according to the embodiment includes the decoder 71, the error correction decoder 72, and the storage 77M. The configuration of the magnetic reproducing processing device 120 may be the same as the configuration of the magnetic reproducing processing device 110, except for the storage 77M.

In the magnetic reproducing processing device 120, the decoder 71 receives the first signal S1 based on the reproduced signal Sig-r. The second signal S2 output from the decoder 71 is input to the error correction decoder 72. The storage 77M includes a first storage region 77a.

The error correction decoder 72 is configured to correct errors in the second signal S2 based on the check matrix H (see FIG. 1). The decoder 71 includes the neural network layer 71L (see FIG. 1). The neural network layer 71L includes the plurality of calculation nodes 71N (see FIG. 1).

The first storage region 77a is configured to store information regarding connection relationships between the plurality of calculation nodes 71N. The connection relationship is based on the check matrix H. The decoder 71 is configured to derive the second signal S2 by calculation based on the first signal S1 and the connection relationship stored in the first storage region 77a. The second signal S2 includes, for example, the likelihood ratio group α2. In the magnetic reproducing processing device 120, errors are suppressed.

In the magnetic reproducing processing device 120, the reproduced signal Sig-r includes the waveform information 75W, the bit position information 75P, and the first likelihood ratio information 75L (first likelihood ratio group α1) (see FIG. 1). The waveform information 75W includes, for example, the first waveform of the first bit, the second waveform of the second bit before the first bit, and the third waveform of the third bit after the first bit. The bit position information 75P includes the position information of the first bit.

As shown in FIG. 4, the storage 77M may further include a second storage region 77b. The second storage region 77b is configured to store information regarding the check matrix H. The error correction decoder 72 performs the error correction using the information regarding the check matrix H stored in the second storage region 77b.

As shown in FIG. 4, the storage 77M may further include a third storage region 77c. The third storage region 77c is configured to store information regarding weights in the decoder 71. For example, in the learning of the decoder 71, information regarding weights stored in the third storage region 77c is applied.

As shown in FIG. 4, in the magnetic reproducing processing device 120, the output of the error correction decoder 72 may be input to the decoder 71. The decoder 71 is configured to use the output of the error correction decoder 72 to output the second signal S2.

Figure 5:
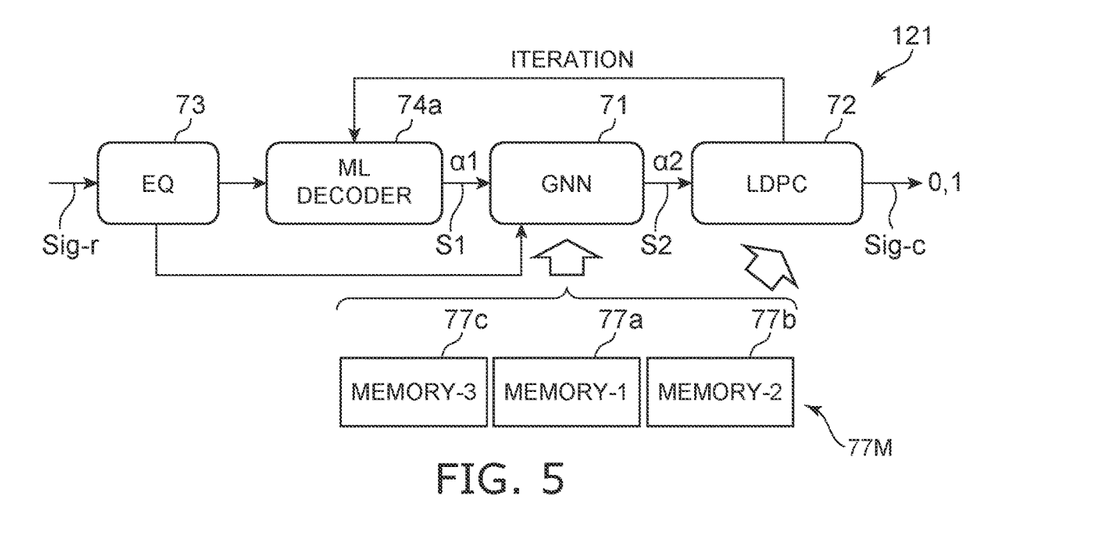
FIG. 5 is a schematic diagram illustrating a magnetic reproducing processing device according to the first embodiment.

FIG. 5 is a schematic diagram illustrating a magnetic reproducing processing device according to the first embodiment.

As shown in FIG. 5, a magnetic reproducing processing device 121 according to the embodiment further includes the first maximum likelihood decoder 74a. The configuration of the magnetic reproducing processing device 121 except for this may be the same as the configuration of the magnetic reproducing processing device 120.

In the magnetic reproducing processing device 121, the signal based on the reproduced signal Sig-r is input to the first maximum likelihood decoder 74a. The output of the first maximum likelihood decoder 74a is input to the decoder 71 as the first signal S1. In the magnetic reproducing processing device 121, errors are further suppressed. The first maximum likelihood decoder 74a may include, for example, a Viterbi decoder.

As shown in FIG. 5, the magnetic reproducing processing device 121 may further include the waveform equalizer 73. The signal based on the reproduced signal Sig-r is input to the waveform equalizer 73. The output of the waveform equalizer 73 may be input to the decoder 71. In this example, the output of the waveform equalizer 73 is input to the first maximum likelihood decoder 74a, and the output of the first maximum likelihood decoder 74a is input to the decoder 71.

Figure 6:
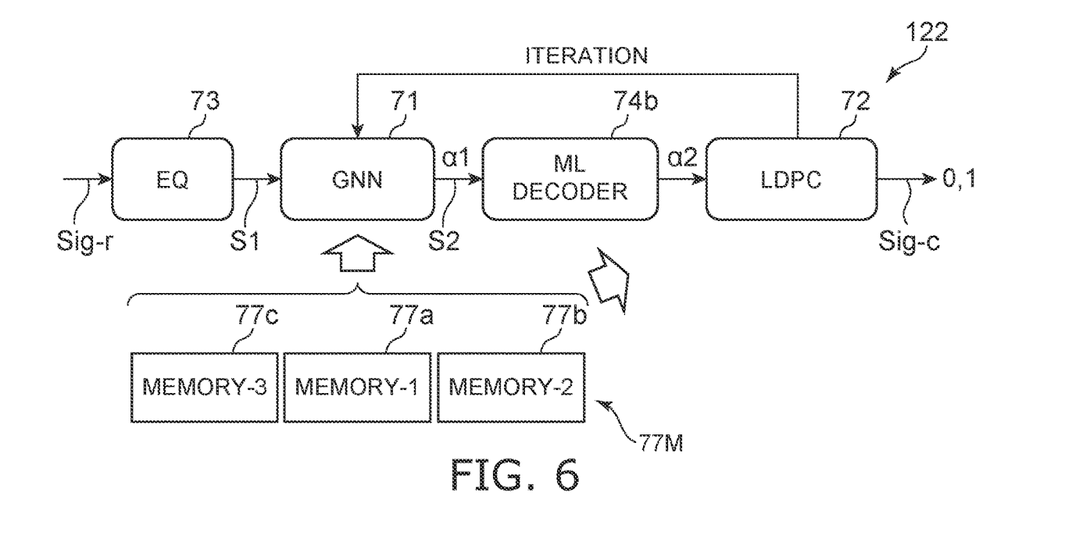
FIG. 6 is a schematic diagram illustrating a magnetic reproducing processing device according to the first embodiment.

FIG. 6 is a schematic diagram illustrating a magnetic reproducing processing device according to the first embodiment.

As shown in FIG. 6, a magnetic reproducing processing device 122 according to the embodiment further includes the second maximum likelihood decoder 74b. The configuration of the magnetic reproducing processing device 122 except for this may be the same as the configuration of the magnetic reproducing processing device 120 or the magnetic reproducing processing device 121.

In the magnetic reproducing processing device 122, the second signal S2 output from the decoder 71 is input to the second maximum likelihood decoder 74b. The output of the second maximum likelihood decoder 74b is input to the error correction decoder 72. In the magnetic reproducing processing device 122, errors are further suppressed. The second maximum likelihood decoder 74b may include, for example, a Viterbi decoder.

As shown in FIG. 6, the magnetic reproducing processing device 122 may further include the waveform equalizer 73. The signal based on the reproduced signal Sig-r is input to the waveform equalizer 73. The output of the waveform equalizer 73 is input to the decoder 71.

The magnetic reproducing processing device according to the embodiment may include a computer.

Figure 7:
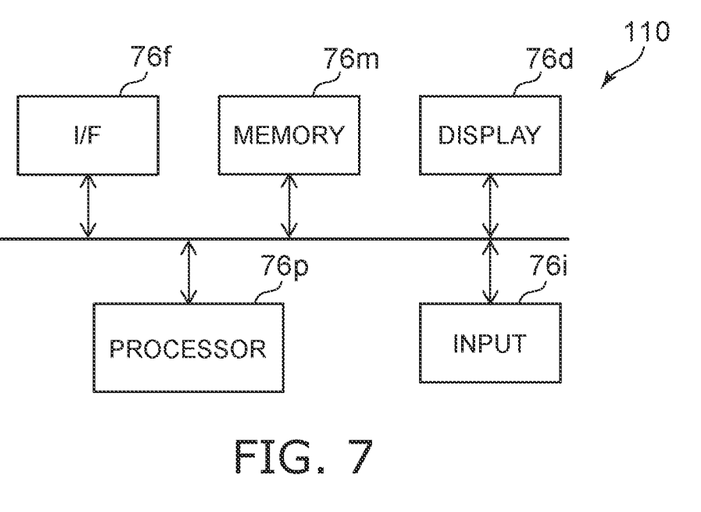
FIG. 7 is a schematic diagram illustrating the magnetic reproducing processing device according to the embodiment.

FIG. 7 is a schematic diagram illustrating the magnetic reproducing processing device according to the embodiment.

As shown in FIG. 7, the magnetic reproducing processing device (for example, the magnetic reproducing processing device 110) according to the embodiment may include a processing circuit 76p, a storage circuit 76m, an interface circuit 76f, and the like. The processing circuit 76p is, for example, an electric circuit. The storage circuit 76m may include, for example, at least one of a ROM (Read Only Memory) or a RAM (Random Access Memory). For example, a part of the magnetic recording/reproducing section 80D may be used as the storage circuit 76m.

The magnetic reproducing processing device (for example, the magnetic reproducing processing device 110) according to the embodiment may include a display device 76d, an input device 76i, and the like. The display device 76d may include various types of displays. The input device 76i includes, for example, a device having an operation function (e.g., a keyboard, a mouse, a touch input panel, a voice recognition input device, etc.).

A plurality of elements included in the magnetic reproducing processing device (for example, the magnetic reproducing processing device 110) according to the embodiment is configured to communicate with each other by at least one of wireless or wired methods. The plurality of elements included in the magnetic reproducing processing device 110 may be provided at different locations. For example, a general-purpose computer may be used as the magnetic reproducing processing device 110. As the magnetic reproducing processing device 110, for example, a plurality of computers connected to each other may be used. A dedicated circuit may be used as at least a part of the magnetic reproducing processing device 110. As the magnetic reproducing processing device 110, for example, a plurality of circuits connected to each other may be used.

The embodiments may include programs. The program causes the computer (magnetic reproducing processing device 110) to perform the above operations. The embodiments may include a storage medium in which the above program is stored.

The magnetic recording/reproducing device according to the embodiment (magnetic recording/reproducing device 210, see FIG. 1) includes any of the magnetic reproducing processing devices according to the first embodiment and their modification.

Second Embodiment

The second embodiment relates to a magnetic reproducing method. The magnetic reproducing method according to the embodiment is a method using the magnetic reproducing processing device (for example, 110 to 112, 120 to 122) according to the first embodiment and its modification. The magnetic reproducing method to suppress errors can be provided.

The embodiments may include the following Technical proposals.

(Technical Proposal 1)
A magnetic reproducing processing device, comprising:
a decoder; and
an error correction decoder,
a first signal based on a reproduced signal being input to the decoder,
a signal based on a second signal output from the decoder being input to the error correction decoder,
the error correction decoder being configured to correct errors in the second signal based on a check matrix,
the decoder including a neural network layer,
the neural network layer including a plurality of calculation nodes, and
a connection relationship between the plurality of calculation nodes being based on the check matrix.

(Technical Proposal 2)
The magnetic reproducing processing device according to Technical proposal 1, wherein
the reproduced signal includes waveform information, bit position information, and first likelihood ratio information,
the waveform information includes a first waveform of a first bit, a second waveform of a second bit before the first bit, and a third waveform of a third bit after the first bit, and
the bit position information includes position information of the first bit.

(Technical Proposal 3)
The magnetic reproducing processing device according to Technical proposal 1 or 2, wherein
an output of the error correction decoder is input to the decoder, and
the decoder is configured to output the second signal using the output of the error correction decoder.

(Technical Proposal 4)
The magnetic reproducing processing device according to any one of Technical proposals 1-3, further comprising:
a first maximum likelihood decoder,
a signal based on the reproduced signal being input to the first maximum likelihood decoder, and
an output of the first maximum likelihood decoder being input to the decoder as the first signal.

(Technical Proposal 5)
The magnetic reproducing processing device according to Technical proposal 4, wherein
the first maximum likelihood decoder includes a Viterbi decoder.

(Technical Proposal 6)
The magnetic reproducing processing device according to any one of Technical proposals 1-4, further comprising:
a second maximum likelihood decoder,
the second signal being input to the second maximum likelihood decoder, and
an output of the second maximum likelihood decoder being input to the error correction decoder.

(Technical Proposal 7)
The magnetic reproducing processing device according to Technical proposal 6, wherein
the second maximum likelihood decoder includes a Viterbi decoder.

(Technical Proposal 8)
The magnetic reproducing processing device according to any one of Technical proposals 1-7, further comprising:
a waveform equalizer,
a signal based on the reproduced signal being input to the waveform equalizer, and
an output of the waveform equalizer being input to the decoder.

(Technical Proposal 9)
The magnetic reproducing processing device according to any one of Technical proposals 1-8, wherein
the second signal includes likelihood ratio group.

(Technical Proposal 10)
The magnetic reproducing processing device according to any one of Technical proposals 1-9, wherein
a number of connections of one of the plurality of calculation nodes is greater than a number of connections of another one of the plurality of calculation nodes, and
in learning of the decoder, a contribution of an error regarding the one of the plurality of calculation nodes is greater than a contribution of an error regarding the other one of the plurality of calculation nodes.

(Technical Proposal 11)

A magnetic reproducing processing device, comprising:
a decoder;
an error correction decoder; and
a storage including the first storage region,
a first signal based on a reproduced signal being input to the decoder,
a signal based on a second signal output from the decoder being input to the error correction decoder,
the error correction decoder being configured to correct errors in the second signal based on a check matrix,
the decoder including a neural network layer,
the neural network layer including a plurality of calculation nodes;
the first storage region being configured to store information regarding a connection relationship of the plurality of calculation nodes,
the connection relationship being based on the check matrix, and
the decoder being configured to derive the second signal by calculation based on the first signal and the connection relationship stored in the first storage region.

(Technical Proposal 12)

The magnetic reproducing processing device according to Technical proposal 11, wherein
the reproduced signal includes waveform information, bit position information, and first likelihood ratio information,
the waveform information includes a first waveform of a first bit, a second waveform of a second bit before the first bit, and a third waveform of a third bit after the first bit, and
the bit position information includes position information of the first bit.

(Technical Proposal 13)

The magnetic reproducing processing device according to Technical proposal 11 or 12, wherein
the storage further includes a second storage region, and
the second storage region is configured to store information regarding the check matrix.

(Technical Proposal 14)

The magnetic reproducing processing device according to any one of Technical proposals 11-13, wherein
the storage further includes a third storage region, and
the third storage region is configured to store information regarding weights in the decoder.

(Technical Proposal 15)

The magnetic reproducing processing device according to any one of Technical proposals 11-14, wherein
an output of the error correction decoder is input to the decoder, and
the decoder is configured to output the second signal using the output of the error correction decoder.

(Technical Proposal 16)

The magnetic reproducing processing device according to any one of Technical proposals 11-15, further comprising
a first maximum likelihood decoder,
a signal based on the reproduced signal being input to the first maximum likelihood decoder, and
an output of the first maximum likelihood decoder being input to the decoder as the first signal.

(Technical Proposal 17)

The magnetic reproducing processing device according to any one of Technical proposals 11-16, further comprising
a second maximum likelihood decoder,
the second signal being input to the second maximum likelihood decoder, and
an output of the second maximum likelihood decoder being input to the error correction decoder.

(Technical Proposal 18)

The magnetic reproducing processing device according to any one of Technical proposals 11-17, wherein
the error correction decoder includes an LDPC (Low-Density Parity-Check Codes) decoder.

(Technical Proposal 19)

A magnetic recording/reproducing device, comprising:
the magnetic reproducing processing device according to any one of Technical proposals 1-18; and
a magnetic recording/reproducing section configured to output the reproduced signal.

(Technical Proposal 20)

A magnetic reproducing method using the magnetic reproducing processing device according to any one of Technical proposals 1 to 18.

According to the embodiments, it is possible to provide a magnetic reproducing processing device, a magnetic recording/reproducing device, and a magnetic reproducing method that can suppress errors.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic reproducing processing devices such as decoders, error correction decoders, storages, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic reproducing processing devices, all magnetic recording/reproducing devices, and all magnetic reproducing methods practicable by an appropriate design modification by one skilled in the art based on the magnetic reproducing processing devices, the magnetic recording/reproducing devices, and the magnetic reproducing methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic reproducing processing device, comprising:
a decoder; and
an error correction decoder,
a first signal based on a reproduced signal being input to the decoder, a signal based on a second signal output from the decoder being input to the error correction decoder, the error correction decoder being configured to correct errors in the second signal based on a check matrix, the decoder including a neural network layer, the neural network layer including a plurality of calculation nodes, and a connection relationship between the plurality of calculation nodes being based on the check matrix.

2. The device according to claim 1, wherein the reproduced signal includes waveform information, bit position information, and first likelihood ratio information, the waveform information includes a first waveform of a first bit, a second waveform of a second bit before the first bit, and a third waveform of a third bit after the first bit, and the bit position information includes position information of the first bit.

3. The device according to claim 1, wherein an output of the error correction decoder is input to the decoder, and the decoder is configured to output the second signal using the output of the error correction decoder.

4. The device according to claim 1, further comprising:

a first maximum likelihood decoder, a signal based on the reproduced signal being input to the first maximum likelihood decoder, and an output of the first maximum likelihood decoder being input to the decoder as the first signal.

5. The device according to claim 4, wherein the first maximum likelihood decoder includes a Viterbi decoder.

6. The device according to claim 1, further comprising:

a second maximum likelihood decoder, the second signal being input to the second maximum likelihood decoder, and an output of the second maximum likelihood decoder being input to the error correction decoder.

7. The device according to claim 6, wherein the second maximum likelihood decoder includes a Viterbi decoder.

8. The device according to claim 1, further comprising:

a waveform equalizer, a signal based on the reproduced signal being input to the waveform equalizer, and an output of the waveform equalizer being input to the decoder.

9. The device according to claim 1, wherein the second signal includes likelihood ratio group.

10. The device according to claim 1, wherein a number of connections of one of the plurality of calculation nodes is greater than a number of connections of another one of the plurality of calculation nodes, and in learning of the decoder, a contribution of an error regarding the one of the plurality of calculation nodes is greater than a contribution of an error regarding the other one of the plurality of calculation nodes.

11. The device according to claim 1, wherein the error correction decoder includes an LDPC (Low-Density Parity-Check Codes) decoder.

12. A magnetic recording/reproducing device, comprising:

the magnetic reproducing processing device according to claim 1; and a magnetic recording/reproducing section configured to output the reproduced signal.

13. A magnetic reproducing method using the magnetic reproducing processing device according to claim 1.

14. A magnetic reproducing processing device, comprising:

a decoder;

an error correction decoder; and a storage including the first storage region, a first signal based on a reproduced signal being input to the decoder, a signal based on a second signal output from the decoder being input to the error correction decoder, the error correction decoder being configured to correct errors in the second signal based on a check matrix, the decoder including a neural network layer, the neural network layer including a plurality of calculation nodes;

the first storage region being configured to store information regarding a connection relationship of the plurality of calculation nodes, the connection relationship being based on the check matrix, and the decoder being configured to derive the second signal by calculation based on the first signal and the connection relationship stored in the first storage region.

15. The device according to claim 14, wherein the reproduced signal includes waveform information, bit position information, and first likelihood ratio information, the waveform information includes a first waveform of a first bit, a second waveform of a second bit before the first bit, and a third waveform of a third bit after the first bit, and the bit position information includes position information of the first bit.

16. The device according to claim 14, wherein the storage further includes a second storage region, and the second storage region is configured to store information regarding the check matrix.

17. The device according to claim 14, wherein the storage further includes a third storage region, and the third storage region is configured to store information regarding weights in the decoder.

18. The device according to claim 14, wherein an output of the error correction decoder is input to the decoder, and the decoder is configured to output the second signal using the output of the error correction decoder.

19. The device according to claim 14, further comprising a first maximum likelihood decoder, a signal based on the reproduced signal being input to the first maximum likelihood decoder, and an output of the first maximum likelihood decoder being input to the decoder as the first signal.

20. The device according to claim 14, further comprising a second maximum likelihood decoder, the second signal being input to the second maximum likelihood decoder, and an output of the second maximum likelihood decoder being input to the error correction decoder.

* * * * *